(12) United States Patent
Haga et al.

(10) Patent No.: US 12,677,746 B2
(45) Date of Patent: Jul. 14, 2026

(54) ATTACHMENT FOR AN AGRICULTURAL HARVESTING VEHICLE

(71) Applicant: CLAAS Saulgau GmbH, Bad Saulgau (DE)

(72) Inventors: Björn Haga, Unlingen (DE); Josef Knörle, Ravensburg/Schmalegg (DE); Christian König, Oberteuringen (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 463 days.

(21) Appl. No.: 18/311,074

(22) Filed: May 2, 2023

(65) Prior Publication Data

US 2023/0363312 A1    Nov. 16, 2023

(30) Foreign Application Priority Data

May 10, 2022    (DE) .......................... 102022111591.7

(51) Int. Cl.
  *A01D 89/00*     (2006.01)
  *A01D 75/20*     (2006.01)

(52) U.S. Cl.
  CPC ........... *A01D 89/008* (2013.01); *A01D 75/20* (2013.01); *A01D 89/002* (2013.01)

(58) Field of Classification Search
  CPC ..... A01D 89/008; A01D 75/20; A01D 89/002
  See application file for complete search history.

(56) References Cited

U.S. PATENT DOCUMENTS 8,186,137 B2    5/2012  Viaud et al.

9,521,807 B2 *  12/2016  Ubaldi ................. A01D 89/008
2010/0043370 A1 *  2/2010  Viaud ................... A01F 15/106
                                                            56/341

FOREIGN PATENT DOCUMENTS

| | | |
|---|---|---|
| DE | 1153931 B | 9/1963 |
| DE | 19911828 B4 | 8/2012 |
| DE | 102012011591 B4 | 3/2015 |
| DE | 102014200770 A1 | 7/2015 |
| DE | 102015113470 A1 | 2/2017 |
| EP | 1621068 B1 | 4/2008 |
| EP | 2156729 B1 | 7/2012 |
| EP | 2896285 B1 | 1/2017 |

OTHER PUBLICATIONS

Search Report from German Patent Office; 2 pages, Dec. 9, 2022.
Expanded Search Report; 2 pages; Oct. 10, 2023.

* cited by examiner

*Primary Examiner* — Nicole Coy
*Assistant Examiner* — Jennifer A Railey

(57)    ABSTRACT

Attachment (10) for an agricultural harvesting vehicle, comprising a frame (11), a crop collecting device (12), a crop conveying device (13) is designed to convey collected crops in the direction of a feeder device, a crop hold-down device (14) which can be displaced relative to the frame (11), and a protection apparatus (18) having at least two portions (19, 20) and extends over the crop collecting device (12) and the crop conveying device (13), wherein a first portion (19) of the protection apparatus (18) and a second portion (20) of the protection apparatus (18) are connected together in an articulated manner, such that with a displacement of the crop hold-down device (14) and the receiver (17) thereof relative to the frame (11), the first portion (19) of the protection apparatus (18) and the second portion (20) of the protection apparatus (18) can be displaced relative to one another.

7 Claims, 2 Drawing Sheets

ATTACHMENT FOR AN AGRICULTURAL HARVESTING VEHICLE

The invention relates to an attachment for an agricultural harvesting vehicle.

A collecting apparatus for an agricultural harvesting machine, which is designed as a so-called pick-up, is disclosed in DE 10 2012 011 591 A1. Such a collecting apparatus has a crop collecting device which is designed to collect from the ground or a substrate crops which lie on the ground in the form of a cut swathe. The crop collecting device is also denoted as a gathering drum. The collecting apparatus also has a crop conveying device which is designed to convey crops collected by the crop collecting device in the direction of a feeder device of the harvesting machine. The crop conveying device is preferably a screw conveyor. Such a collecting apparatus also has a crop hold-down device which is positioned at the top onto the crops and namely onto the swathe consisting of the cut crops. Such a collecting apparatus, which is configured as a pick-up, can be designed as an attachment for an agricultural harvesting vehicle.

In the attachments known from practice, which are designed as a collecting apparatus or pick-up, the region above the crop collecting device and the transport device is open at the top. Whirling crops can thus impair the field of view of a driver of the agricultural harvesting vehicle. Moreover, whirling crops can pass into the region of fan inlets and cooling inlets of the harvesting vehicle and clog up these inlets.

DE 199 11 828 B4 discloses a dirt trapping device for an agricultural harvesting vehicle. The agricultural harvesting vehicle has an attachment which is configured either as a pick-up or as a maize picker. The dirt trapping device is fitted onto the attachment.

The dirt trapping device of DE 199 11 828 B4 has a frame in which a net or grille is fastened, wherein the frame is fastened on one side in an articulated manner to a frame or framework of the attachment. The dirt trapping device known from this prior art has a considerably limited effect. It is not possible to improve significantly the field of view of a driver of the harvesting vehicle. It is also not possible to prevent whirling crops from passing into the region of cooling inlets and air inlets of the harvesting vehicle.

There is a need for an attachment in which whirling crops can be prevented from passing into the region of cooling inlets and fan inlets of the agricultural harvesting vehicle. Whirling crops are also intended to be reliably prevented from impairing the field of view of a driver of the harvesting vehicle.

Proceeding therefrom, it is the object of the present invention to provide a novel attachment for an agricultural harvesting vehicle.

This object is achieved by an attachment according to claim 1.

The attachment according to the invention comprises a frame. The attachment according to the invention also comprises a crop collecting device which is designed to collect crops from a substrate. The attachment according to the invention also comprises a crop conveying device which is designed to convey collected crops in the direction of a feeder device of the harvesting vehicle. The attachment according to the invention also comprises a crop hold-down device which is mounted on a receiver which can be displaced relative to the frame. The attachment according to the invention also comprises a protection apparatus which has at least two portions and which extends over the crop collecting device and over the crop conveying device, wherein a first portion of the protection apparatus and a second portion of the protection apparatus are connected together in an articulated manner, such that with a displacement of the crop hold-down device and the receiver thereof relative to the frame, the first portion of the protection apparatus and the second portion of the protection apparatus can be displaced relative to one another.

The protection apparatus of the attachment according to the invention has at least two portions which act on one another in an articulated manner. With a displacement of the crop hold-down device and the thus of the receiver thereof relative to the frame and thus relative to the crop conveying device and the crop collecting device, the portions of the protection apparatus can be displaced relative to one another. As a result, a region above the crop conveying device and the crop collecting device can be reliably covered, irrespective of the relative position of the crop hold-down device to the crop collecting device and the crop conveying device. There is no risk of whirling crops passing into the region of cooling inlets and fan inlets of the harvesting vehicle or impairing the field of view of the driver. The protection apparatus is automatically adapted to the position of the hold-down device, without the need for manual adjustment.

Preferably, the first portion of the protection apparatus acts in an articulated manner on the receiver of the crop hold-down device and the second portion of the protection apparatus acts in an articulated manner on the first portion thereof. This is particularly preferred in order to ensure in a simple manner that when the position of the crop hold-down device or the receiver thereof changes, an automatic adaptation of the protection apparatus is ensured.

Preferably, the second portion of the protection apparatus acts in an articulated manner on the frame. In this case, the protection apparatus has two portions. This design is particularly simple in terms of construction.

Preferably, the portions of the protection apparatus in each case have lateral arms, wherein the lateral arms of the first portion of the protection apparatus act in an articulated manner on the receiver of the crop hold-down device via first joints which define a first pivot axis or through which the first pivot axis extends, and wherein the lateral arms of the first portion of the protection apparatus act on lateral arms of the second portion of the protection apparatus via second joints which define the second pivot axis or through which the second pivot axis extends. These features also permit a structurally simple design of the attachment, namely of the protection apparatus thereof, in order to ensure the automatic adaptation of the protection apparatus to the position of the crop hold-down device.

Preferably, struts extending in the transverse direction of the attachment run between the lateral arms of the portions of the protection apparatus, wherein a common covering tarpaulin, a covering net or a combination of a tarpaulin and a net for all of the portions of the protection apparatus is arranged on the struts. Thus a region above the crop collecting device and the crop conveying device can be completely covered by simple means. A collecting region and a conveying region of the attachment can thus be completely closed at the top in a simple manner. Whirling crops can thus be prevented in a particularly simple manner from impairing the field of view of the driver and from passing into cooling inlets and air inlets and clogging up these inlets.

A protection apparatus according to the invention particularly advantageously prevents crop losses and advantageously provides protection from foreign bodies, such as for example stone chippings, or the like.

Preferred developments of the invention are found in the dependent claims and the following description. Exemplary embodiments of the invention are explained in more detail with reference to the drawing, without being limited thereto.

In the drawing:

FIGS. 1 and 2 show in each case side views of an attachment for an agricultural harvesting vehicle in different states of the attachment. FIGS. 3 and 4 show perspective views of the attachment, wherein some assemblies of the attachment are not shown in FIG. 4.

Figure 1:
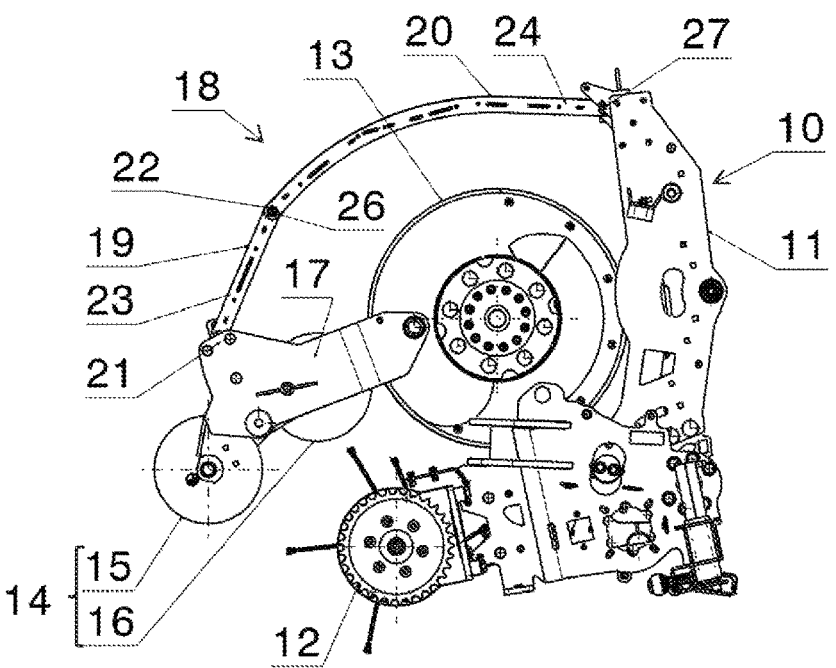
FIG. 1 shows a side view of an attachment for an agricultural harvesting vehicle according to the invention, together with a protection apparatus in a first state of the attachment.

The attachment 10 has a frame 11, wherein the attachment 10 can be attached and thus coupled via the frame 11 to the agricultural harvesting vehicle, a so-called carrier vehicle.

The attachment 10 has a crop collecting device 12 which is rotatably mounted on the frame 11 and which is designed to collect crops from a substrate. At the same time, the crop collecting device 12 collects from a substrate the cut crops which have collected or piled up on the substrate in the form of a so-called swathe.

The attachment 10 also has a crop conveying device 13 which is also rotatably mounted on the frame. The crop conveying device 13 can be displaced relative to the crop collecting device 12 and thus mounted on a different portion of the frame 11 from the crop collecting device 12.

The crop conveying device 13 is designed to convey crops collected from the substrate by the crop collecting device 12 in the direction of a feeder device of the harvesting vehicle, and namely in the transverse direction of the attachment and thus perpendicularly to a forward direction of movement of the harvesting vehicle. The crop conveying device 13 is preferably a screw conveyor.

The attachment 10 also has a crop hold-down device 14 which in the exemplary embodiment shown is formed by two rollers 15, 16. The rollers 15, 16 and thus the crop hold-down device 14 are mounted on a receiver 17 which can be displaced relative to the frame 11. The receiver 17 for the rollers 15, 16 of the crop hold-down device 14 can be displaced relative to the portions of the frame 11 on which the crop collecting device 12 and the crop conveying device 13 are mounted. During operation, the crop hold-down device 14 is positioned with its rollers 15, 16 on the swathe of the crops which have been cut and collected on the substrate.

Figure 2:
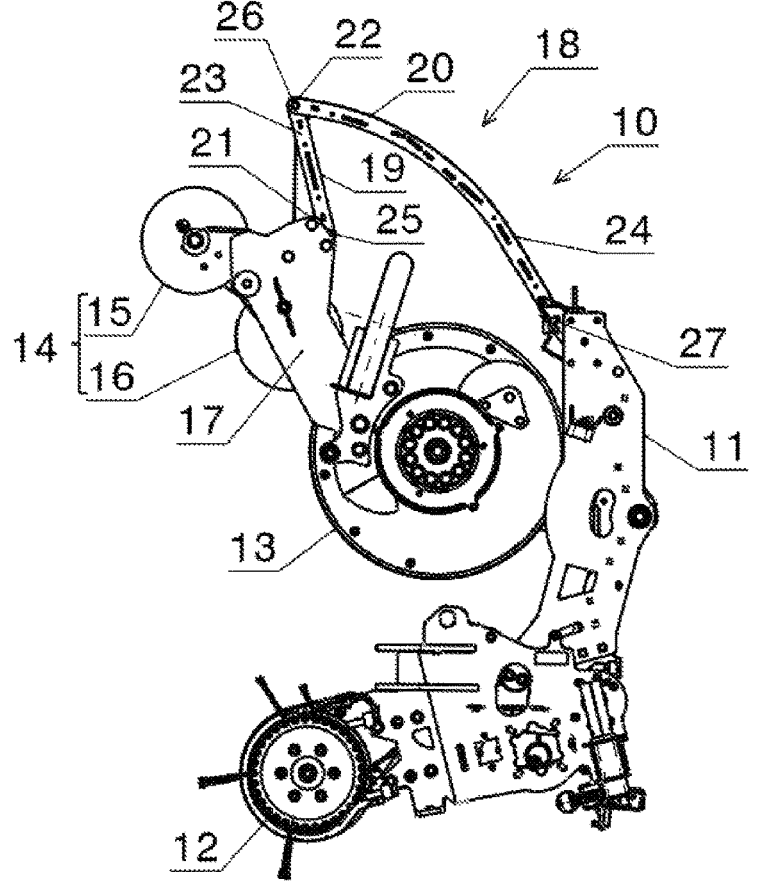
FIG. 2 shows the side view of FIG. 1 in a second state of the attachment.

FIG. 1 shows the crop hold-down device 14 in a position which is lowered in the direction of the substrate. FIG. 2 shows the crop hold-down device 14 in a lifted-out position.

As the receiver 17 and thus the crop hold-down device 14 can be displaced relative to the frame 11 and relative to the crop collecting device 12 and to the crop conveying device 13, during operation the crop hold-down device 14 can be automatically adapted to the swathe, wherein the rollers 15, 16 of the crop hold-down device 14 and the receiver 17 are then displaced automatically relative to the frame 11 and the crop collecting device 12 and the crop conveying device 13.

The attachment 10 also has a protection apparatus 18 which extends over the crop collecting device 12 and the crop conveying device 13, and prevents the crops which are whirling during operation from flying around in an uncontrolled manner and impairing the field of view of a driver of the harvesting vehicle or from passing into cooling inlets or fan inlets of the harvesting vehicle.

The protection apparatus 18 has at least two portions 19, 20 which are connected together in an articulated manner, and namely such that with a displacement of the crop hold-down device 14 and the receiver 17 thereof relative to the frame 11, and relative to the crop collecting device 12 and the crop conveying device 13, a first portion 19 of the protection apparatus 18 can be displaced relative to a second portion 20 of the protection apparatus 18, and namely automatically. If the relative position of the hold-down device 14 changes relative to the frame 11 and relative to the crop collecting device 12 and the crop conveying device 13, due to a change in a swathe consisting of cut crops, the portions 19, 20 of the protection apparatus 18 can be automatically displaced relative to one another such that the protection apparatus 18 is automatically adapted to the position of the hold-down device 14.

The first portion 19 of the protection apparatus 18 is attached in an articulated manner to the receiver 17 of the crop hold-down device 14 about a first pivot axis 21. The second portion 20 of the protection apparatus 18 is attached in an articulated manner to the first portion 19 of the protection apparatus 18 about a second pivot axis 22. If the receiver 17 of the crop hold-down device 14 performs a movement, the relative position of the two portions 19 and 20 of the protection apparatus 18 changes automatically in relation to one another.

In the exemplary embodiment shown, the first portion 19 of the protection apparatus 18 has lateral arms 23 and the second portion 20 has lateral arms 24.

The lateral arms 23 of the first portion 19 of the protection apparatus 18 are connected at the ends thereof in an articulated manner to the receiver 17 of the crop hold-down device 14, via first joints 25 which define the first pivot axis 21 or through which the first pivot axis 21 extends.

The lateral arms 23 of the first portion 19 of the protection apparatus 18 are also connected at the opposing ends thereof to the lateral arms 24 of the second portion 20 of the protection apparatus 18, via second joints 26 which define the second pivot axis 22 or through which the second pivot axis 22 extends.

In the exemplary embodiment shown, the protection apparatus 18 exclusively has the two portions 19, 20, wherein the second portion 20 of the protection apparatus 18 acts in an articulated manner about a third pivot axis 27 on the frame 11 of the attachment 10. In this case, the lateral arms 24 of the second portion 20 of the protection apparatus 18 act in an articulated manner on the frame 11 of the attachment 10 via third joints 28 which define the third pivot axis 27 or through which the third pivot axis 27 extends.

It is also possible that in addition to the two portions 19, 20 the protection apparatus 18 of the attachment 10 has a third portion (not shown), wherein in this case the second portion 20 does not act in an articulated manner on the frame 11 but in an articulated manner on the third portion (not shown) about a third pivot axis (not shown), and wherein then the third portion (not shown) of the protection apparatus is preferably rigidly fastened to the frame 11. In this case, accordingly the lateral arms 24 of the second portion 20 act on arms of the third portion (not shown) via the third joints which in turn are fixedly connected to the frame 11.

Figure 3:
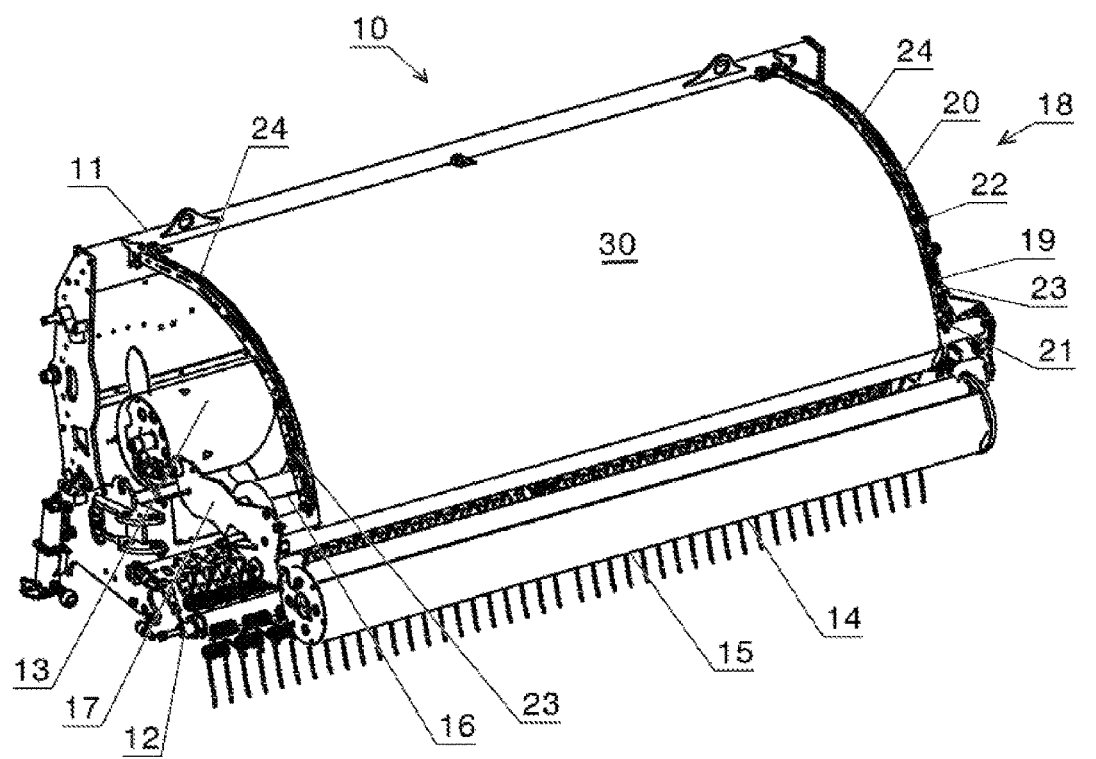
FIG. 3 shows a perspective view of the attachment according to the invention in the state of FIG. 1.
Figure 4:
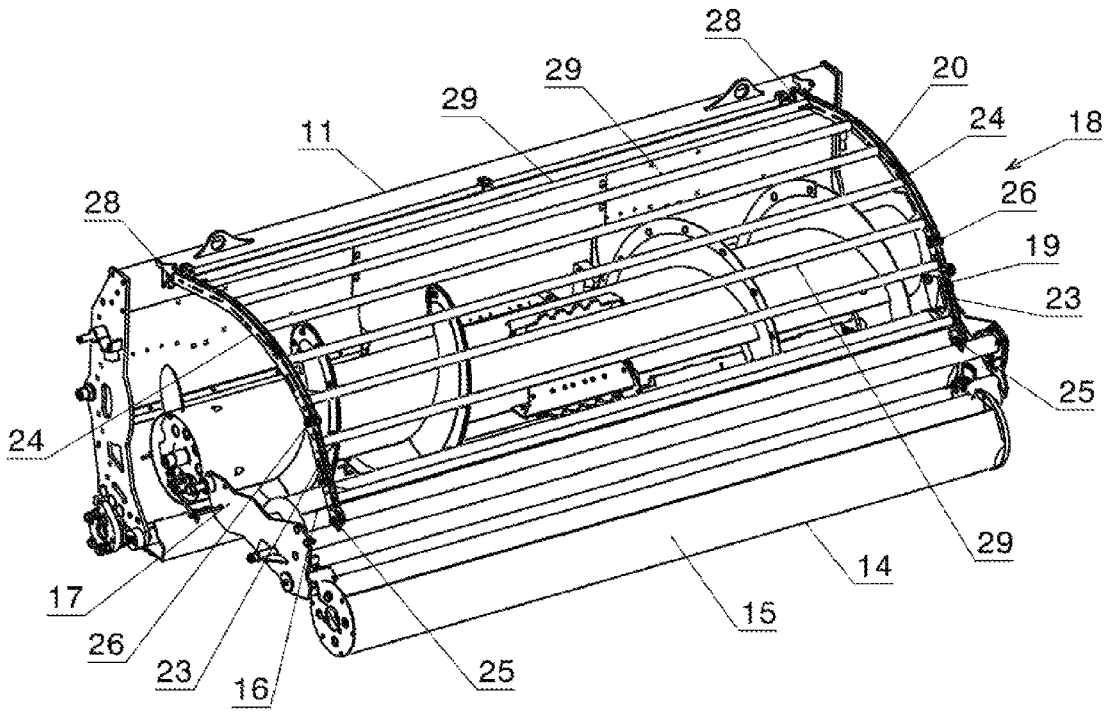
FIG. 4 shows the view of FIG. 3 without the covering tarpaulin, without the crop collecting device and without the crop conveying device.

As can be most clearly derived from FIGS. 3 and 4, the width of the protection apparatus 18 in the transverse direction of the attachment is adapted to the width of the crop hold-down device 14. The protection apparatus 18, when viewed in the transverse direction of the attachment 10, accordingly extends almost over the entire axial length of the crop collecting device 12 and the crop conveying device 13. Only the lateral end pieces of the crop collecting device 12 and the crop conveying device 13 protrude laterally relative to the edges of the protection apparatus 18.

The width of the protection apparatus 18 preferably extends over the entire width of the crop collecting device 12 and the crop conveying device 13. In the case of larger working widths of the attachment, it can be provided that the protection apparatus 18 does not extend over the entire width but only covers the central region.

According to FIG. 4 struts 29 running in the transverse direction of the attachment 10 extend between the afore-mentioned arms 23, 24 of the portions 19, 20 of the protection apparatus 18. A common covering tarpaulin 30 for all of the portions 19, 20 of the protection apparatus 18 is arranged on these struts 29. This covering tarpaulin 30 can be slightly deformed with the displacement of the relative position of the portions 19, 20 of the protection apparatus 18, in order to cover the crop collecting device 12 and the crop conveying device 13 at the top in all relative positions via the protection apparatus 18.

The covering tarpaulin 30 can alternatively be designed as a covering net 30 or as a combination of a tarpaulin and a net. The transparency of a net advantageously opens up the view of the covered parts of the attachment and the pro-cessed crops for the driver of the harvesting vehicle.

In the exemplary embodiment shown, a kink point is integrated in the protection apparatus 18 according to the invention. This kink point is configured in the region of the pivot axis 22 between the two portions 19, 20 of the protection apparatus 18. A plurality of such kink points can also be present and namely when the protection apparatus 18 has more than two portions 19, 20. The portions 19, 20 of the protection apparatus 18 can be displaced relative to one another such that the fully functional scope of the attach-ment 10 is maintained. Thus according to FIG. 2 it is also possible to lift out the crop conveying device 13 and the crop hold-down device 14 completely.

The protection apparatus 18 provides an upwardly closed feeder region of the attachment 10. It is possible to com-pensate automatically for relative movements of the crop hold-down device 14. Whirling crops can be reliably pre-vented from impairing the field of view of the driver and from passing into the region of cooling inlets and fan inlets of the harvesting vehicle.

LIST OF REFERENCE SIGNS

10 Attachment
11 Frame
12 Crop collecting device
13 Crop conveying device
14 Crop hold-down device
Roller
16 Roller
17 Receiver
18 Protection apparatus
19 Portion
Portion
21 Pivot axis
22 Pivot axis
23 Arm
24 Arm Joint
26 Joint
27 Pivot axis
28 Joint
29 Strut
30 Covering tarpaulin, covering net or combination of net/tarpaulin

The invention claimed is:

1. An attachment (10) for an agricultural harvesting vehicle comprising:
 a frame (11),
 a crop collecting device (12) which is designed to collect crops from a substrate,
 a crop conveying device (13) which is designed to convey collected crops in the direction of a feeder device of the harvesting vehicle,
 a crop hold-down device (14) which is mounted on a receiver (17) which can be displaced relative to the frame (11), and
 a protection apparatus (18) which has at least two portions (19, 20) and which extends over the crop collecting device (12) and over the crop conveying device (13),
 wherein a first portion of the at least two portions (19) of the protection apparatus (18) and a second portion of the at least two portions (20) of the protection apparatus (18) are connected together in an articulated manner, such that with a displacement of the crop hold-down device (14) and the receiver (17) thereof relative to the frame (11), the first portion of the at least two portions (19) of the protection apparatus (18) and the second portion of the at least two portions (20) of the protec-tion apparatus (18) can be displaced relative to one another,
 wherein each of the least two portions (19, 20) of the protection apparatus (18) have lateral arms (23, 24); and
 wherein struts (29) extending in the transverse direction of the attachment run between the lateral arms (23, 24) of the at least two portions (19, 20) of the protection apparatus (18), wherein a common covering tarpaulin (30) or a covering net (30) or a combination of a covering tarpaulin and a covering net (30) for all of the portions of the protection apparatus is arranged on the struts (29).

2. The attachment according to claim 1, characterized in that the protection apparatus (18) in the transverse direction of the attachment has a width which is adapted to the width of the crop hold-down device (14).

3. The attachment according to claim 1, characterized in that lateral arms (23) of the first portion of the at least two portions (19) of the protection apparatus (18) acts in an articulated manner on the receiver (17) of the crop hold-down device (14) via first joints (25) which define a first pivot axis (21) or through which the first pivot axis (21) extends, and in that the lateral arms (23) of the first portion of the at least two portions (19) of the protection apparatus (18) act on lateral arms (24) of the second portion of the at least two portions (20) of the protection apparatus via second joints (26) which define a second pivot axis (22) or through which the second pivot axis (22) extends.

4. The attachment according to claim 1, characterized in that the lateral arms (24) of the second portion of the at least two portions (20) of the protection apparatus (18) act in an articulated manner on the frame (11) of the attachment via third joints (28) which define the third pivot axis (27) or through which the third pivot axis extends.

5. The attachment according to claim 1, characterized in that the attachment can be coupled via the frame (11) to the agricultural harvesting vehicle.

6. The attachment according to claim 1, characterized in that the crop hold-down device (14) is to be positioned on the collected crops.

7. The attachment according to claim 1, characterized in that the protection apparatus is covering the entirety of crop collecting device (12) and crop conveying device.

\* \* \* \* \*